March 7, 1967 J. P. JONES, JR 3,307,781

PAPER TAPE PUNCH

Filed June 18, 1965 2 Sheets-Sheet 1

INVENTOR
JOHN PAUL JONES, JR.
BY
Watson, Cole, Grindle & Watson
ATTORNEYS

PAPER TAPE PUNCH

INVENTOR
JOHN PAUL JONES, JR.

BY Watson, Cole, Grindle & Watson
ATTORNEYS

United States Patent Office 3,307,781
Patented Mar. 7, 1967

3,307,781
PAPER TAPE PUNCH

John Paul Jones, Jr., Wynnewood, Pa., assignor to Navigation Computer Corporation, Norristown, Pa., a corporation of Pennsylvania Filed June 18, 1965, Ser. No. 465,009
8 Claims. (Cl. 234—111)

This invention relates to paper tape punches, and more particularly it relates to selectable punching apparatus useful in high speed paper tape punches of the type used in telegraph transmission and digital computer operations.

The limitations of prior art punches used in data processing applications for preparing coded paper tape are basically in the areas of speed of operation, maintenance, wear and adjustments of critical tolerances. Because of the necessity of packing ten punches and associated punching mechanisms across a one inch punching area to meet standards set up in data processing paper tapes, it is difficult to provide reliable punch operation with small size components. Conventional in the punching art has been the use of cyclically operating devices using movable cams or continuously running motors in order to provide the power drive to punch pins after selection of interposer devices for the individual pins by means of an electromagnetic coil or the like. This imposes a further restriction of requiring an external data processing system to be synchronized in operation with the local motor drive or punch cycling mechanism.

Accordingly it is an object of this invention to provide improved high speed punching apparatus which may be confined into a small space and which corrects the deficiencies of the prior art devices above mentioned.

A further object of the invention is to provide a punching system which has few moving parts and permits little wear of parts.

A further object of the invention is to provide a paper tape punch useful in data processing applications which does not require critical adjustments during operation and which is capable of long-life at high speed without routine or failure maintenance problems.

Thus in accordance with the present invention a paper tape punch is provided with an electromagnetically operated reciprocating power source which can be asynchronously actuated at any time at high speeds for a punch cutting cycle. In conjunction with the asynchronous drive means, a set of punch pins are actuated selectively from a coded character signal by setting interposers which can be operated at very high speeds. The interposer in accordance with this invention is an elastic wire or finger having a fixed mount at one end and permitting free three dimensional motion at the other end. This finger is moved by an electromagnetic coil to deflect it into and out of the interposer positions in accordance with the receipt of input code signals.

Thus a tape punch mechanism is provided which can be asynchronously operated, confined within a small space, and operated at high speeds with very few moving parts and with little wear or maintenance. Accordingly the foregoing further features and advantages of the invention are described with particularity in the following specification and claims, wherein reference is made to the accompanying drawings in which:

Figure 1:
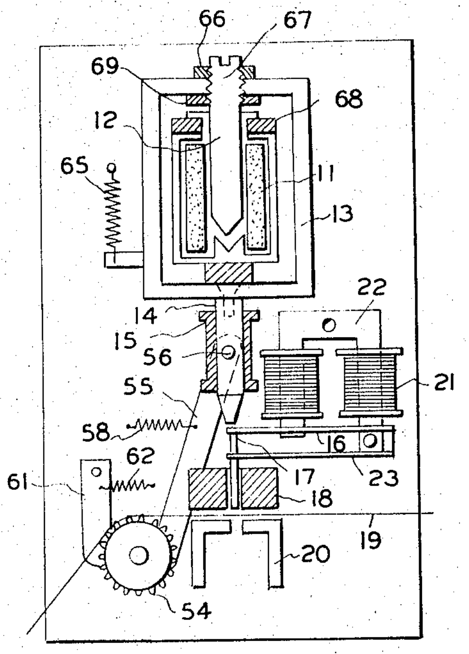
FIGURE 1 is an elevation view, partially in section, of a coded paper tape punch provided in accordance with the invention.
Figure 3:
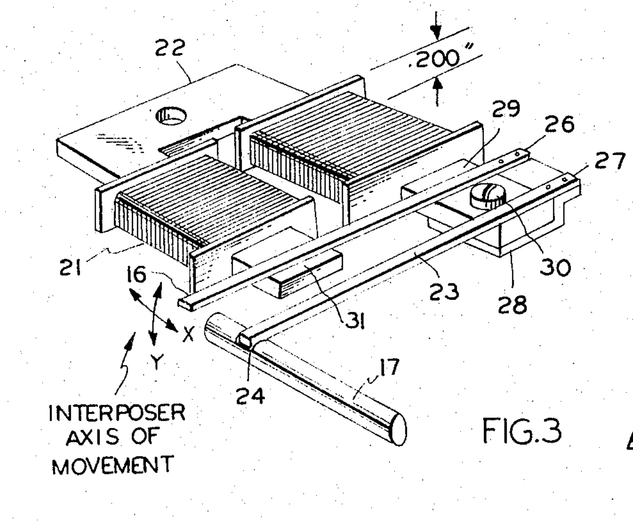
FIGURE 3 is a perspective view of a sub-assembly illustrating operation of the interposer mechanism upon receipt of a code signal.
Figure 4:
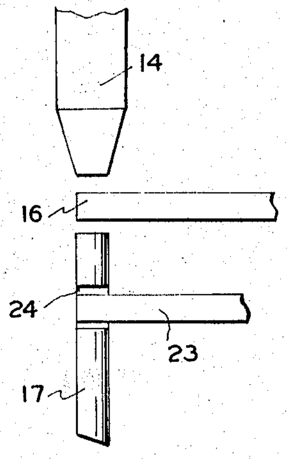
FIGURE 4 is a fragmental top view in elevation of the interposer array of FIGURE 1 taken along the axis X of FIGURE 3.
Figure 5:
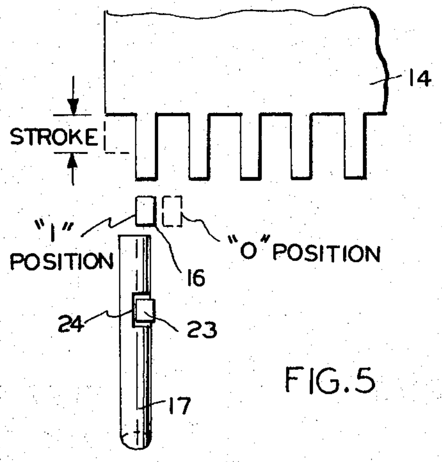
FIGURE 5 is a fragmental left end view of the interposer array of FIGURE 1, taken along the axis Y of FIGURE 3.

As shown in FIGURE 1, an electromagnetic solenoid coil 11 operates upon armature 12 to move the enclosed cage 13 reciprocably up and down as shown in the drawing. This moves a comb assembly (better shown in FIGURE 5) up and down into the journalled bearing 15 which may be made of nylon, for example, to operate upon interposer fingers 16 to push down the punch pins 17 through the guide block 18 and the paper 19 to cut a hole in the paper by way of anvil 20. For illustrating operation, the interposer mechanism is shown in FIGURE 3 where a single thin laminar interposer selection coil 21 with its corresponding horseshoe magnet 22 is provided for operation of the electromagnetic fingers 16 into and out of the interposer gap, as may be seen more specifically with reference to FIGURE 5. Thus when the electromagnetic coil 21 is energized with the code signal, the corresponding interposer arm 16 associated with pin 17, which is one of the plurality of pins positioned across the width of the paper 19, it can take either position 1 or position 0 as shown in FIGURE 5 between the comb 14 and the pin 17 so that the stroke of the comb 14 will serve either to push the pin down through the punching position or to leave the pin where it is and permit the flexible finger 16 to ride up between the teeth of the comb assembly 14.

It may be seen that the second flexible spring member 23, which is parallel with spring 16, is inserted in slot 24 of the pin 17 in order to provide a return spring bias for retracting the pin after the punch stroke sends the cutting edge of the punch through the paper tape. Thus the flexible finger 23 moves only in a single plane X of motion, whereas the actuating finger 16 moves in the direction of plane Y upon action of the electromagnetic interposer assembly and moves in a different degree of motion in the direction of plane X during the cutting stroke cycle. Both fingers are in essence small spring wires which are affixed by spot welding or otherwise fastened at positions 26 and 27 to the carriage array 28 which is adjustably positioned along the magnetic arm 29 of the horseshoe magnet 22 by means of the adjustment screw 30. It is noted that there is a small air gap between the other magnet arm 31 which provides an air gap with the elastic finger 16. Upon energization of the magnet coil 21 the air gap is closed by pulling the elastic ferromagnetic member 16 in contact with the magnet pole 31. At no time during either this motion or the stroke motion does the elastic limit of the interposer come close to its maximum, and therefore there is no possible wear upon the interposer except at the end position where it is interposed between the comb and the punch pin, and for this reason it is hardened in that region by a tempering process.

It is noted that this assembly is thin so that ten such assemblies may be packed per inch across the usual one inch punched paper tape. Also it is advantageous to permit adjustment of the carriage assembly 28 by means of loosening and tightening the screw 30 to place the interposer in the proper position for the tolerances of the assembly for impact by the comb 14 to drive the pin 17. This is accomplished in this array without changing the gap between the interposer arm and the magnet since the adjustment is in the plane X which does not change in any manner the gap with the interposer 16 and the magnet pole 31. As may be appreciated from the assembly since the spring is very light and very small, it may be operated at very high speeds by means of the magnetic assembly, even though it is mounted in a very small space and requires a power stroke thereon to operate the punch pin through the cutting cycle.

Figures 6, 7, 8:
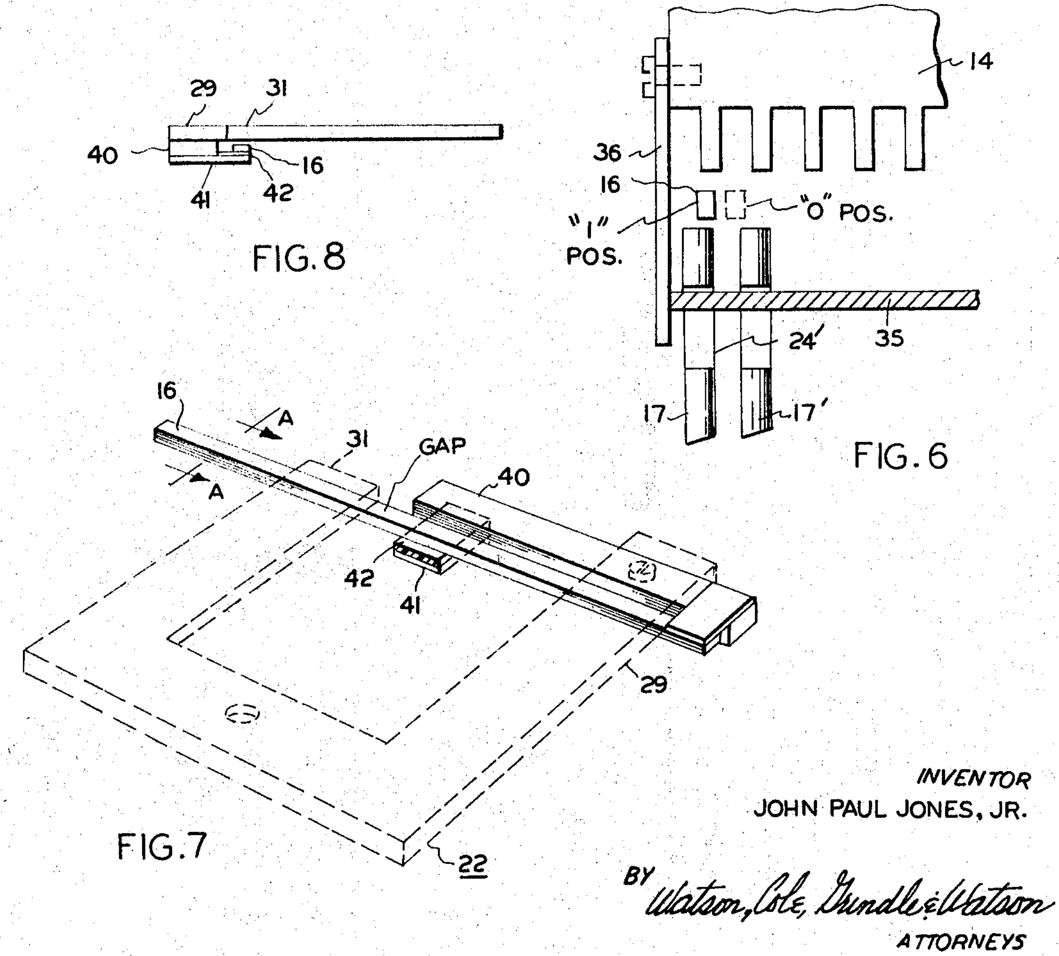
FIGURE 6 is a fragmental view of the further embodiment of the interposer array showing alternative pin retraction means.
FIGURE 7 is a sketch in perspective of an alternative electromagnetic interposer drive mechanism.
FIGURE 8 is a partial end view of the embodiment of FIGURE 7 looking in the direction A—A thereon.

A further embodiment of the interposer assembly is shown in FIGURE 6 where the pins are forcibly and powerfully retracted by means of the reciprocal motion of the comb assembly 14 which has a retracting bar 35 mounted upon the bracket 36. This retracting bar 35 operates in the modified slot 24', which is oriented at right angles to the slot 24 so that the retracting bar 35 can operate upon all the adjacent punch pins 17, 17', etc. In essence if the interposer 16 is not in position to cause the pin to take a stroke with the comb 14 during the reciprocal cycle, the pin is not moved since the interposer bar 35 can slide down the widened slot 24' for the entire duration of the cutting stroke. However if the interposer is in a "1" position and the pin is stroked down together with the comb assembly for a cutting stroke, upon retraction of the reciprocal movement, the retraction bar 35 will engage a top portion of the slot and return the pins back to their rest position.

A further modification of the interposer assembly sketched in connection with FIGURES 7 and 8. Because of the small proportions of the elastic fingers 16 which is a spring steel wire or the like, operational speed can be restricted by a tendency to vibrate. Also it is of such small dimensions that it poses considerable magnetic reluctance between poles 29 and 31 of the magnet 22. Thus a magnetic helper bar 40 is provided to decrease the effective gap distance between the two poles 29 and 31 of the magnet. In this manner, the effective field is established between a narrow gap appearing between the helper bar 40 and the pole 31 to operate upon the movable electromagnetic finger 16 with more magnetic efficiency. In addition a stop pad 42 of felt or the like is provided on the stop plate 41 to damp any tendency of the end of the spring to vibrate when it is released from its closed magnetic position against pole 31. Accordingly it is seen that the novel spring interposer provided in accordance with this invention which is affixed at one end may be electromagnetically operated in various manners to provide high speed interposer action with very little inertia and without providing any significant wear or maintenance problems on moving parts.

Figure 2:
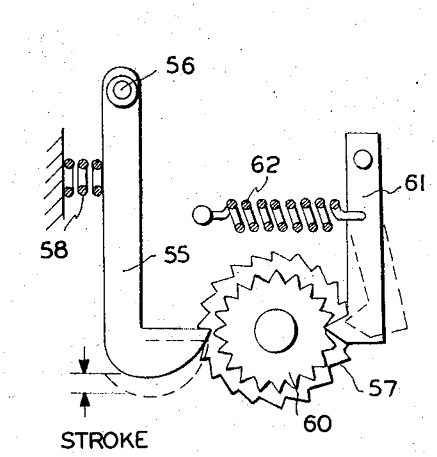
FIGURE 2 is a rear view of the paper tape advance mechanism partially shown in FIGURE 1.

Now returning to the overall punch assembly of FIGURE 1, it is seen that the plurality of magnetic interposer actuating assemblies 22 are stacked up in a row looking into the drawing to operate a plurality of corresponding punch pins 17 by means of the comb assembly 14 as it is reciprocated during a power stroke produced by energizing solenoid 11. This power stroke also serves to advance the tape in step by step increments by means of the sprocket 54 and the actuating lever arm 55 as shown more clearly in FIGURE 2.

It is seen that the lever arm 55 is carried in a reciprocal motion by the solenoid at pivot point 56 to operate upon the ratchet wheel 57 by sliding over the tooth against force of spring 58 on a sprocket tooth during the downward stroke of the lever 55 and grabbing a new tooth for pulling the sprocket into a new tape position upon the return stroke. This operation holds the tape in a detented punching position by means of detent wheel 60, which pushes the detent lever 61 in and out of the detenting cam surfaces against the pressure of spring 62. Thus, in this illustrated embodiment of the invention, the solenoid serves not only to provide power for the cutting strokes of the various punch pins but also serves to advance the paper tape 19 increment by increment as each cycle is operated in an asynchronous manner by energization of the solenoid coil 11.

As seen in FIGURE 1, the return spring 65 of the drive solenoid cage 13 is utilized to cause the entire reciprocating assembly to return to its rest position, in which it is shown in the drawing. To permit for appropriate adjustment to the length of the stroke and the pulling power of the solenoid, the armature 13 is provided with threads at its outer end for longitudinal adjustment as retained by the locking nut 66. In order to reduce the amount of noise caused by operation of the relay assembly, urethane or rubber bumpers 67 and 68 are provided at each end of the operation stroke which is designated by the gap or spacing 69.

It may therefore be seen from the foregoing detailed description of the invention in a typical embodiment that applicant has improved the state of the art by providing a paper tape punch assembly which can be mounted in a small space and operated at high speeds without substantial wear or maintenance and which need not be synchronized in connection with its internal mode of operation. Having therefore described the invention and its various features, those elements which are believed descriptive of the nature and scope of the present invention are defined in particularly in the appended claims.

What is claimed is:

1. In a paper tape punch, a reciprocating power source, a set of punch pins, an interposer of ferromagnetic material positioned for selective entry between the power source and each of said pins to drive the pins through a cutting stroke by said power source, wherein the interposer is an elastic finger having a fixed mount at one end permitting free three dimensional motion at the outer end serving as said interposer for elastic deformation in a first degree of motion by force of said power source, and magnetic means for deflecting the free end of said elastic finger selectively in and out of the interposing position in a second degree of motion.

2. Apparatus as defined in claim 1 wherein the finger is moved in said first degree of motion before being moved in said second degree of motion.

3. Apparatus as defined in claim 1 wherein a second elastic finger parallel to the first is provided in engagement with a corresponding punch pin to serve as a retraction spring returning the pin after a power cutting stroke.

4. Apparatus as defined in claim 1 wherein the magnetic means comprises a horseshoe electromagnet, the fixed mount is adjustably positionable on one extending pole of the magnet, and the entire finger is magnetic material which bridges the poles of said magnet with a gap existing in the de-energized state of the electromagnet, wherein the gap is not changed by positioning said mount.

5. Apparatus as defined in claim 1 wherein a comb array is reciprocated by said source, with teeth being aligned with said punch pins to serve as an interposer hammer, the stroke of reciprocation being less than the thickness of the interposer, the comb array with voids positioned to receive the deflected end of the finger without motion in said first degree when deflected in said second degree.

6. Apparatus as defined in claim 1 wherein said pins have a slot therein, and a bar operated with said reciprocating source rides in only a portion of said slot to permit the bar to ride downward in those pins not undertaking a cutting stroke and forceably engaging one end of the slot in a return stroke to return said pins from a cutting stroke position.

7. Apparatus as defined in claim 1 wherein the magnetic means comprises an electromagnet with a gap partly bridged by said finger, and a stop member with a damping pad thereon is positioned to engage said finger when it is drawn into a position closing said gap by the electromagnet.

8. Apparatus as defined in claim 4 wherein the finger has an adjacent ferromagnetic helper member paralleling it across a significant portion of the gap between the poles of the magnet.

References Cited by the Examiner

UNITED STATES PATENTS

| | | | |
|---|---|---|---|
| 3,038,654 | 6/1962 | Steiner | 234—115 |
| 3,104,053 | 9/1963 | Rabinow | 234—115 |
| 3,253,778 | 5/1966 | Hunter | 234—114 |

WILLIAM W. DYER, Jr., *Primary Examiner.*

GERALD A. POST, *Examiner.*